Patented Dec. 6, 1932

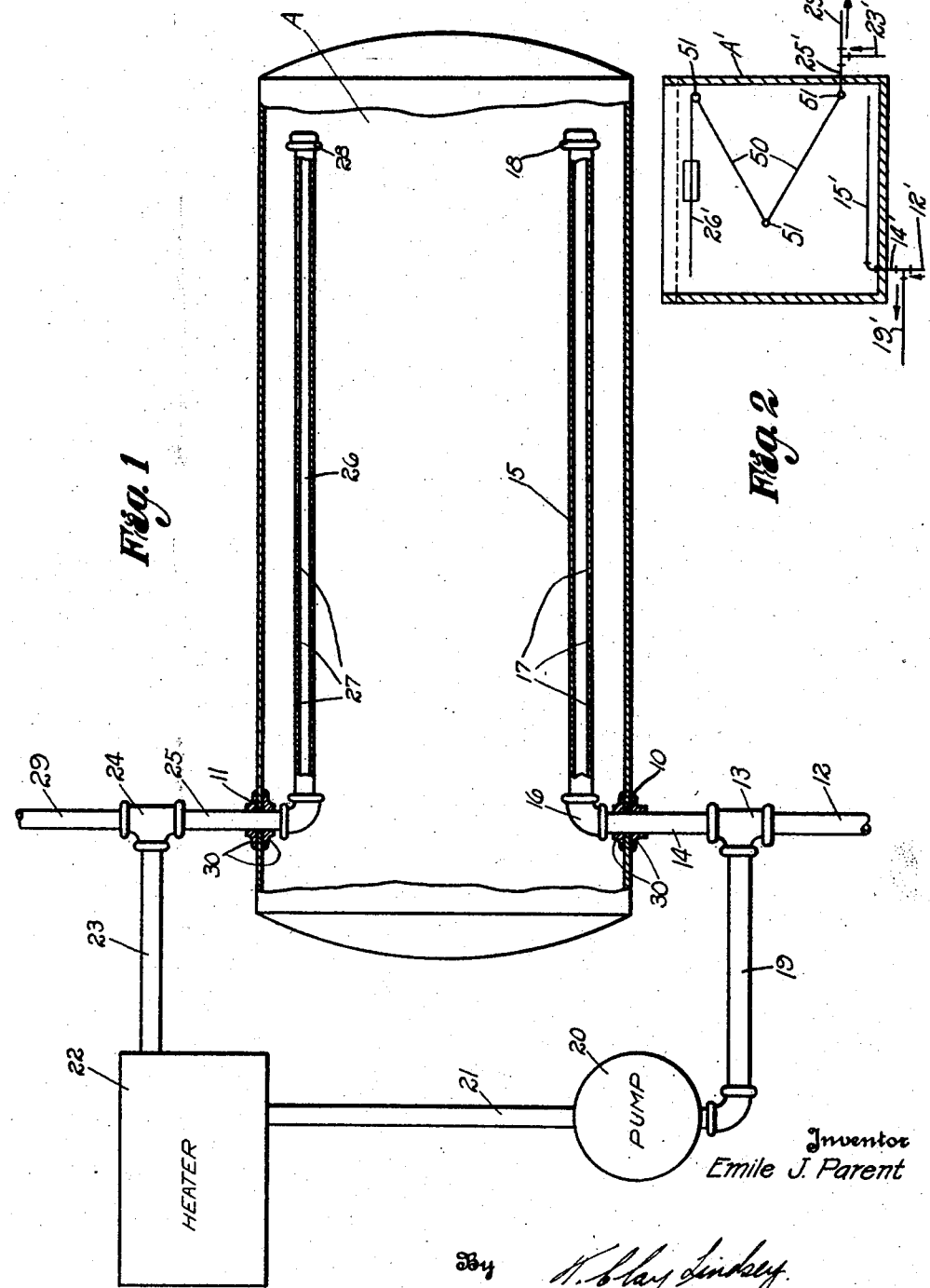

1,890,263

UNITED STATES PATENT OFFICE

EMILE J. PARENT, OF HARTFORD, CONNECTICUT, ASSIGNOR TO THE WHITLOCK COIL PIPE COMPANY, OF WEST HARTFORD, CONNECTICUT, A CORPORATION OF CONNECTICUT

WATER HEATING SYSTEM

Application filed January 16, 1931. Serial No. 509,135.

This invention has for its principal objects the provision of certain novel improvements in water heating systems, such as are illustrated, described and claimed in the patent to Ransom 1,698,561, granted under date of January 8, 1929. The Ransom patent is referred to by way of exemplification, only.

In said Ransom patent is disclosed a heating system having an accumulator or reservoir and an outside connection between the bottom and the top of the reservoir, and which connection includes a heater for heating the liquid and means for propelling the liquid at a rate predetermined to equal the average of a variable rate of withdrawal of the heated liquid. In the illustrative disclosure of said patent, there is a diffuser in the lower portion of the accumulator, and one end of this diffuser is connected to a pipe leading from a pressure main or the like, and the other end of the diffuser is connected to the intake of the propelling means or pump. Likewise, in the upper portion of the accumulator or tank is a diffuser, the opposite ends of which are connected to the heater and to a pipe leading to the point of distribution. Each of these diffusers is provided with openings which are graduated in size. Since the water is admitted to each diffuser at one end and taken out at the other end, it follows that if the openings in the diffuser are graduated so as to effect an equal distribution of the water into the tank, then the arrangement is not as effective when the water is withdrawn from the tank through the diffuser. For example, if the openings in the diffuser in the bottom of the tank are of gradually increasing size as they progress away from the inlet end of the diffuser, the incoming water will pass from the diffuser into the tank more or less uniformly throughout the length of the diffuser, but, when the water is drawn by the pump from the tank through the diffuser and delivered to the heater, more water will flow through the enlarged openings adjacent the outlet end of the diffuser than through the smaller openings more remotely located, and thus a uniform withdrawal of water through the diffuser openings is not obtained. Also with the illustrative embodiment of the Ransom invention shown in said patent, it is necessary to provide in a tank two holes or apertures for each diffuser, that is, a hole for the pipe leading to a diffuser and a hole for the pipe leading from a diffuser, together with pipe and plate joints for sealing these holes.

In accordance with the present invention, cold water is admitted to, and is drawn from, the lower portion of the tank or reservoir through a single hole which is connected to the inlet pipe and also to the outside connection which includes the pump and the heater. Likewise, the heated water is admitted to the upper portion of the reservoir and withdrawn therefrom through a single hole. More particularly, a diffuser pipe for cold water is positioned in the lower portion of the reservoir, and one end of this diffuser is connected to the supply of incoming water and to the outside connection. A similar arrangement is employed in the upper portion of the reservoir wherein the diffuser is connected at one and the same end to the outside connection and to the distributing pipe which leads to the point of use. These diffuser pipes are each provided with spaced openings graduated up in size from the end to which, and from which, the water is admitted and withdrawn.

This arrangement presents the advantage of providing for better distribution effects on the part of the diffusers in the reservoir. The most efficient and desirable action on the part of the accumulator requires a more or less clear line of demarcation between the heated water in the upper portion and the cold water in the lower portion. Inasmuch as the cold water (and likewise, the heated water) is admitted to, and taken from, the tank through the same end of the diffuser arranged as described, this line of demarcation remains substantially undisturbed by the withdrawal of, and the admittance of, water to the tank.

Another advantage of importance which attends the use of a system following this invention is the substantial absence of any fluctuations of temperature in the cold water as it passes to the heater. While the heated water is being drawn from the system, cold water passes directly from the fresh water main to the heater. Agitation of the contents of the reservoir is reduced to a minimum, with resulting benefits in the form of the clear line of demarcation between the hot and cold water. Another advantage, from the manufacturer's view point, which is provided by this invention, is the increased simplicity of the system, together with the reduced manufacturing cost. By admitting cold water to the tank and drawing it therefrom through the same hole, it is only necessary to provide but one pipe and plate joint, where two would have to be employed were the cold water to be admitted to the tank at one hole and drawn therefrom through another. This same condition of availing of the minimum number of holes in the tank is duplicated with the heated water diffuser. Moreover, installation of the system is facilitated by providing the features of admitting the water to the tanks, and drawing it therefrom, through the same holes.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

For a full and more complete understanding of the invention, reference may be had to the following description and accompanying drawing, wherein:

Fig. 1 is a diagrammatic illustration of a water heating system embodying the improvements of this invention, and wherein the accumulator is closed; and Fig. 2 is a schematic layout showing my improvements applied to an open accumulator or storage tank.

Inasmuch as the water heating system designed in accordance with this invention follows generally the teachings of the Ransom patent, said Ransom patent may be referred to for the detailed illustration and description of the water heating system illustrated and described therein. In the present instance, a system is developed more or less diagrammatically along the lines of the system shown in the Ransom patent, and may be briefly described as including a reservoir, or tank A, with which are associated a pump, indicated diagrammatically at 20, and a heater shown at 22.

The tank A is provided with an aperture or hole 10 through which the cold water passes on being admitted to, and drawn from, the interior of the tank. This hole 10 is located in the lower portion of the cylindrical wall of the reservoir, while a similar hole 11 for the heated water is located in the upper portion of the wall. A cold water diffuser 15 extends lengthwise of the reservoir A in the lower portion thereof, and is connected at one end by a coupling 16 with a pipe 14 which extends through the hole 10. Saddle plates 30 are positioned on each side of the wall of the tank A about the hole 10 to provide a pipe and plate joint with its desired sealing effects. The end of the diffuser 15 remote from the coupling 16 is closed, as shown at 18, and the under side of the diffuser pipe is provided with the spaced openings 17 which are graduated in size. In the instant embodiment, these openings increase in size as they progress away from that end of the diffuser to which, and from which, the water is admitted and withdrawn.

This same arrangement of the diffuser on the cold water side of the reservoir is duplicated on the heated water side. The heated water diffuser 26 is connected at one end by a coupling to a pipe 25 which extends through the hole 11. Saddle plates 30 cooperate with the pipe 25 and the wall of the reservoir to provide the necessary pipe and plate joint. The diffuser 26 is closed at one end, as shown at 28, and is provided with diffusing openings 27 on its upper side which are graduated up in size toward the closed end of the diffuser. The openings in the diffusers are shown diagrammatically and more or less exaggerated in the accompanying drawing, it being understood that there are quite a number of these openings in each of the diffuser pipes, and the aggregate area of the openings will depend upon various factors.

Referring now more particularly to the flow of water to, and from, the heater 22, it is noted that a pipe line 12 leads from a fresh water main (not shown) to a three-way coupling 13. One lead of the latter is connected with the pipe 14, while the other lead is connected with a pipe 19 which extends to the pump 20. The latter is connected with the heater 22 by a pipe line 21. Another pipe 23 extends from the heater to a three-way coupling 24, one lead of which is connected by the pipe 25 with the heated water diffuser. From the other lead of the coupling 24, extends a pipe line 29 going to the point of the use of the heated water. The pipes 19, 21, and 23 may be referred to as forming what may be referred to, for convenience only, as an "outside connection".

In view of the Ransom patent, it is not necessary to here describe in detail the operation of this system, except to point out that the cold water is admitted to, and withdrawn from, the lower end of the tank through the same end of the bottom diffuser, and the hot water is admitted to the upper end of the tank and is drawn therefrom through the same end of the upper diffuser. At times, depending upon the amount of water being withdrawn from the system, the cold water will pass directly from the pipe 12, through the pump and heater, and through the outlet pipe 29 to the point of use, and when the system is so operated there are practically no disturbing influences within the tank. At other times, a portion of the hot water being used will be withdrawn from the upper portion of the tank or reservoir, while cold water is admitted to the lower end of the tank through the bottom diffuser pipe. At other times, particularly when no water is being withdrawn, or when the amount of water being withdrawn is relatively small, cold water will be drawn from the lower end of the tank by the pump 20, pass through the heater, and then into the upper end of the tank. With the described arrangement of openings in the diffusers, the communication between the diffusers and the tank is substantially uniform throughout the length of the diffusers so that, as previously stated, agitation in the tank is reduced to a minimum. The system operates with a higher degree of efficiency, and other advantages previously pointed out are obtained. It is evident that the system is readily installed, and is of comparative simplicity and reduced manufacturing cost, due to the small number of pipe and plate connections with the tank.

The improvements of the present invention are not limited to an application wherein the accumulator or storage tank is closed but, on the contrary, they may be embodied in a system having an open tank or accumulator, as shown schematically in Fig. 2. In this figure, the tank A' is open at its top. The cold water diffuser in the lower end of the tank A' is similar and may, in fact, be identical to the corresponding diffuser of the preceding embodiment and may be similarly connected up. Therefore, this diffuser and its connections bear corresponding reference numerals, except that the same are primed. The hot water diffuser 26' may be of a construction similar to the diffuser 26 of the preceding embodiment and serves similar functions. In the embodiment shown in Fig. 2, however, this diffuser is adapted to float so that it may move up and down as the level of the water in the tank goes up and down. For this purpose, one end of the diffuser is connected by pipe sections 50 and swivel joints 51 to a pipe 25' corresponding to the pipe 25 of the preceding embodiment. This pipe 25' is connected to the pipe 29' which may lead to the point of use of the heated water. The pipe 25' is also connected to a pipe 23' which may extend from the heater. The operation of the arrangement shown in Fig. 2 may be generally similar to that explained in connection with Fig. 1 and, therefore, needs no further description.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

It is, of course, understood that my improved system may be employed for heating liquids of any kind and that the word "water" is herein used for convenience and this word is to be taken to include liquids of various sorts.

What is claimed is:

1. A water heating system comprising a reservoir, a cold water diffuser in the lower portion of said reservoir, a hot water diffuser in the upper portion of said reservoir, means such as a pressure supply line connected to said cold water diffuser, an outlet pipe connected to said hot water diffuser, and a connection including a heater and a pump, the lower end of said connection and said supply pipe being connected at the same point to said cold water diffuser, and the upper end of said connection and said outlet pipe being connected to the same portion of said hot water diffuser, each of said diffusers having openings of gradually increasing size as they progress away from the point at which the water is admitted to, and withdrawn from, said diffusers.

2. In a water heating system of the character described, a reservoir, a cold water diffuser in the lower portion of the reservoir, a hot water diffuser in the upper portion of the reservoir, a supply pipe, an outlet pipe, and a connection including a pump and a heater, one end of said connection and said supply pipe being connected to the same end of said cold water diffuser, and the other end of said connection and said outlet pipe being connected to the same end of said hot water diffuser whereby the water is admitted to and withdrawn from the same end of each diffuser, each of said diffusers having graduated openings increasing in size as they progress away from said mentioned ends thereof.

3. In a water heating system of the character described, a reservoir having an opening in its lower portion and an opening in its upper portion, a cold water diffuser in the lower portion of said reservoir and connected with a pipe extending through said first mentioned opening, a heated water diffuser in the upper portion of said reservoir connected with a pipe extending through the other opening, the other ends of said diffusers being closed, a connection leading from said first pipe to said second pipe and including a water heater and a pump, a cold water pipe line leading to said first pipe, and an outlet pipe line leading from said second pipe, said diffusers having spaced openings increasing in size as they progress away from the said pipes.

EMILE J. PARENT.